United States Patent
Koike et al.

(10) Patent No.: US 6,191,067 B1
(45) Date of Patent: Feb. 20, 2001

(54) TITANIA FIBER, METHOD FOR PRODUCING THE FIBER AND METHOD FOR USING THE FIBER

(75) Inventors: Hironobu Koike; Yasuyuki Oki; Yoshiaki Takeuchi, all of Niihama (JP)

(73) Assignee: Sumitomo Chemical, Ltd., Osaka (JP)

( * ) Notice: Under 35 U.S.C. 154(b), the term of this patent shall be extended for 0 days.

(21) Appl. No.: 09/523,456

(22) Filed: Mar. 10, 2000

Related U.S. Application Data

(62) Division of application No. 08/999,334, filed on Dec. 29, 1997, now Pat. No. 6,086,844.

(30) Foreign Application Priority Data

| Dec. 26, 1996 | (JP) | 8-348930 |
| Mar. 26, 1997 | (JP) | 9-073713 |
| Apr. 25, 1997 | (JP) | 9-109627 |

(51) Int. Cl.$^7$ ................................ B01J 23/00
(52) U.S. Cl. ............ 502/350; 502/305; 502/308; 502/309; 502/312; 502/314; 502/315; 502/321; 502/326; 502/337; 502/339; 502/349; 502/353; 502/355; 502/439; 423/594; 423/595; 423/598; 423/600
(58) Field of Search ............... 502/305, 308, 502/309, 312, 314, 315, 321, 326, 337, 339, 349, 350, 353, 355, 439; 423/594, 595, 598, 600

(56) References Cited

U.S. PATENT DOCUMENTS

| 4,166,147 | 8/1979 | Lange et al. |
| 4,176,089 | 11/1979 | Cull ........................ 252/452 |
| 4,375,779 | 3/1983 | Fischer ........................ 87/6 |
| 4,511,455 | 4/1985 | Dosch et al. ................. 208/10 |
| 4,543,341 | 9/1985 | Barringer et al. .............. 501/1 |
| 4,738,896 | 4/1988 | Stevens ..................... 428/315.9 |
| 4,753,827 | 6/1988 | Yoldas et al. .................. 427/387 |
| 4,830,989 | 5/1989 | Trivedi et al. .................. 501/35 |
| 4,882,133 | 11/1989 | Saegusa ........................ 423/335 |
| 4,900,848 | 2/1990 | Saito et al. ..................... 549/517 |
| 5,035,784 | 7/1991 | Anderson et al. ............. 204/158.14 |
| 5,051,391 | 9/1991 | Tomisawa et al. ............... 502/242 |
| 5,177,045 | 1/1993 | Anthony et al. .................. 502/164 |
| 5,202,152 | 4/1993 | Giannelis et al. ................ 427/108 |
| 5,294,584 | * 3/1994 | Yoshida et al. .................. 502/242 |
| 5,300,592 | 4/1994 | Kanagawa et al. ............... 525/488 |
| 5,328,975 | 7/1994 | Hanson et al. ................... 528/29 |

FOREIGN PATENT DOCUMENTS

| 49124336 | 11/1974 | (JP) . |
| 50087974 | 7/1975 | (JP) . |
| 53041518 | 4/1978 | (JP) . |
| 53052737 | 5/1978 | (JP) . |
| 55113625 | 9/1980 | (JP) . |
| 59041928 | 10/1984 | (JP) . |
| 60104133 | 6/1985 | (JP) . |
| 62223323 | 10/1987 | (JP) . |
| 01246139 | 10/1989 | (JP) . |
| 02019569 | 1/1990 | (JP) . |

(List continued on next page.)

OTHER PUBLICATIONS

Gelest, Inc. Gelest (Manufacturers of Metal–Organics). Sol–Gel Applications of Metal Alkoxides. pp. 13–14, 1991.

Primary Examiner—Steven P. Griffin
Assistant Examiner—Cam N. Nguyen
(74) Attorney, Agent, or Firm—Pillsbury Madison & Sutro LLP

(57) ABSTRACT

A continuous fiber of titania are made having an average diameter per a monofilament of from 5 to 50 μm, which has a BET specific surface area of 10 m$^2$/g or more, a pore volume of 0.05 cc/g or more, a volume of pores having a pore diameter of not less than 10 angstroms being 0.02 cc/g or more and an average tensile strength per a monofilament of 0.1 GPa or more, or which has an average tensile strength per a monofilament of 0.5 GPa or more.

5 Claims, 2 Drawing Sheets

FOREIGN PATENT DOCUMENTS

| | | |
|---|---|---|
| 02164722 | 6/1990 | (JP) . |
| 02184525 | 7/1990 | (JP) . |
| 05184923 | 7/1993 | (JP) . |
| 06134306 | 5/1994 | (JP) . |
| 08011196 | 2/1996 | (JP) . |

* cited by examiner

TITANIA FIBER, METHOD FOR PRODUCING THE FIBER AND METHOD FOR USING THE FIBER

This is a division of application Ser. No. 08/999,334, filed Dec. 29, 1997; now U.S. Pat. No. 6,086,844 issued Jul. 11, 2000.

FIELD OF THE INVENTION

The present invention relates to a continuous fiber of titania which can be used as, for example, a carrier for carrying type catalyst which can be used for reduction of a nitrogen oxide and oxidation of an organic compound, a photocatalyst, a filter for high temperature, an electronic material and a reinforcing filler, and a method for producing the fiber and a method for using the fiber.

The present invention also relates to a catalyst component-carrying titania fiber which can be used for reduction of a nitrogen oxide and oxidation of an organic compound, and a method for producing the catalyst component-carrying titania fiber and a method for using the catalyst component-carrying titania fiber.

BACKGROUND OF THE INVENTION

Heretofore, a titanium oxide has been used as a catalyst carrier for, for example, reducing a nitrogen oxide and oxidizing an organic compound, wherein the carrier holds a catalyst component (e.g. a material selected from a metal such as V, W, Al, As, Ni, Zr, Mo, Ru, Mg, Ca and Pt, its oxide and its complex oxide.) The titanium oxide is also used as a photocatalyst or a carrier for photocatalyst. The titanium oxide is normally used in the form of a powder, a particle or pellet.

With a recent expansion in use of the titanium oxide, some characteristics have been required, but they can not be accomplished by the above conventional forms of titanium oxide. In order to cope with the requirements, various titania fibers have been developed.

However, these titania fibers have problems that the length of each fiber is about several millimeters (in other words, the fibers are so-called short fibers) and the mechanical strength of the fibers is not sufficient.

The following methods (1) to (7) have hitherto been known for producing titania fibers:

(1) a method comprising the steps of subjecting a potassium titanate fiber as a starting material to a depotassiumation treatment in an acid solution and calcining the resultant to produce a titania fiber see JP-A-53-41518, JP-A-53-52737, JP-A-55-113625, JP-B-59-41928, JP-A-1-246139 and JP-A-2-164722);

(2) a method comprising the steps of spinning polytitanoxane to obtain a precursor fiber and calcining the precursor fiber to produce a titania fiber (JP-A-49-124336);

(3) a method comprising the steps of concentrating an water-miscible titania sol obtained by adding a titanium alkoxide in a concentrated hydrochloric acid to form a spinning solution, spinning the titania sol and calcining the resultant to obtain a titania fiber (U.S. Pat. No. 4,166,147);

(4) a method comprising the steps of adding water and hydrochloric acid to an alcohol solution of titanium tetraisopropoxide to hydrolyze the propoxide, carrying out polycondensation to form a spinning solution and spinning the resulting condensation product to obtain a titania fiber (a so-called sol-gel method)(JP-A-62-223323);

(5) a method comprising the steps of reacting a titanium alkoxide with an aliphatic dicarboxylic acid in a solvent to prepare a polymer, concentrating the reaction mixture, spinning the polymer and calcining the resultant to obtain a titania fiber (JP-A-60-104133);

(6) a method comprising the steps of wet-spinning an arginic acid solution to form a continuous fiber, immersing the continuous fiber in a titanium solution, drying the continuous fiber with stretching and calcining to produce a titania fiber (JP-A-2-184525); and (7) a method comprising steps of impregnating an organic fiber with an aqueous titanium alkoxy hydrogen peroxide solution and calcining the fiber to it produce a titania fiber (JP-A-2-19569.)

It has proven difficult to produce a so-called continuous fiber of titania having a length of at least several tens centimeters, excellent spinning stability and excellent mechanical strength in an industrially easy manner by the above-disclosed conventional methods. Additionally, the conventional methods suffer from various drawbacks.

According to method (1), the resulting fiber is a so-called short fiber wherein a fiber length is normally not more than 1 mm, and at most about several millimeters. It is impossible to produce a continuous fiber. According to method (3), a water-miscible titania sol is used to form a spinning solution. The use of the high-concentrated inorganic acid (e.g. concentrated hydrochloric acid, etc.) to produce the sol restricts the choice of material for the vessel and means that chlorine derived from concentrated hydrochloric acid remains as an impurity contaminating in the resulting fiber.

According to the sol-gel method(4), titanium alkoxide is hydrolyzed and polycondensated in the presence of an acid such as hydrochloric acid to obtain a viscous solution having suitable spinnability, which is used as a spinning solution. in the method (4), it is difficult to control the hydrolysis reaction and the polycondensation reaction and the spinnable viscous solution is easily converted into a solution which can not be spun.

According to method (5) the residual amount of an organic component in the polymer is large and the content of the organic component in the precursor fiber is necessarily high as a result of reacting a titanium alkoxide with an aliphatic dicarboxylic acid in a solvent to prepare a polymer, since an organic group exists in a side chain and between titanium atoms of the polymer. According to the method (6) of wet-spinning an arginic acid solution and immersing the resulting fiber in a titanium solution and according to the method (7) of impregnating an organic fiber with an aqueous titanium alkoxy hydrogen peroxide solution, the residual amount of an organic component in a precursor fiber is large. When a titania fiber is obtained by calcining the precursor fiber containing a large residual amount of the organic component, there is a problem that the mechanical strength of the resulting fiber is low.

Since there is no need to use an organic polymer and a binder according to the method (2), a continuous fiber having high mechanical strength to some degree is obtained. However, a continuous fiber having satisfactory mechanical strength is not always obtained.

As described above, a conventional titania fiber does not satisfy required characteristics criteria for a continuous fiber of titania having excellent spinning stability and high mechanical strength. Additionally, for example, when used as a catalyst carrier, it is particularly required that specific surface area and pore volume of the fiber are high. Nevertheless, those of the conventional titania fiber are not high. When used as a catalyst carrier for reduction of a nitrogen oxide, it is particularly required that the crystal form is an anatase. Nevertheless, it is very difficult to obtain a titania fiber having this crystal form in the conventional methods.

Even in a method comprising steps of immersing a titania fiber in an acid to partially corrode the surface of the fiber for the purpose of increasing the specific surface area, which is based on a conventional method of using a fiber of silica, alumina, etc. as a catalyst carrier (described in JP-A-50-87974 and JP-B-8-11196), there are problems that it is difficult to form uniform pores on the surface of the fiber and the mechanical strength of the fiber is quite low as compared with a fiber of silica and/or alumina, and that this partially corroding method itself is complicated.

On the other hand, as a method of carrying a catalyst component on and/or in a titania fiber, the following methods are also known but all methods are not sufficient.

For example, JP-A-5-184923 discloses that a vanadium oxide-carrying titania fiber is obtained by heat-treating an amorphous fiber to deposit a crystal of an anatase-form titanium oxide and a crystal of a vanadium oxide. In this method, the amorphous fiber was produced by a sol-gel method of hydrolyzing a alkoxide in a solution of a titanium alkoxide and a vanadium compound or hydrolyzing alkoxides in a solution of a titanium alkoxide, the other alkoxide and a vanadium compound, followed by gelation. However, the titania fiber obtained by this method has problems in that, since an amorphous titanium oxide phase and anatase-form titanium oxide phase coexist, the shape of the fiber can not be sufficiently retained and the catalystic activity removing a nitrogen oxide is low.

JP-A-6-134306 discloses that a catalyst-carrying titania fiber is obtained by forming a polymer including titanium and silicon from organic alkoxides of titanium alkoxide and a silicon alkoxide by a sol-gel method, spinning to form a fiber, drying and calcining the fiber to obtain a fiber of $TiO_2$-$SiO_2$, and carrying vanadium pentaoxide and/or tungsten oxide. According to this method, a titania fiber having an anatase crystal is obtained, however, physical properties such as specific surface area and pore volume are not satisfactory, necessarily.

SUMMARY AND OBJECTS OF THE INVENTION

The present inventors have devoted intensive efforts to discover a continuous fiber of titania having excellent spinning stability and high mechanical strength and a continuous fiber of titania having large specific surface area and large pore volume, which are suitable as a catalyst carrier, and methods for producing continuous fibers of titania on an industrial scale. As a result, the present inventors have discovered a continuous fiber of titania having excellent spinning stability and high mechanical strength which is obtainable on an industrial scale by hydrolyzing and polymerizing a titanium alkoxide under specified conditions, dissolving the resulting polymer in the presence of a specified solution, spinning by using of the resulting solution as a spinning solution, followed by calcination and, furthermore, that a continuous fiber of titania having extremely large specific surface area and pore volume is obtainable by subjecting a precursor fiber of titania to a water vapor treatment before and/or during calcination.

The present inventors have also discovered the combination of a titania fiber carrying a catalyst component, wherein the titania fiber has large active surface area and large pore volume. The catalyst component of the titania fiber hardly comes off and high activity can be maintained for a long period of time.

The present invention accomplished the foregoing and other objective by first providing a continuous fiber of titania wherein an average diameter per a monofilament is from 5 to 50 $\mu$m and a tensile strength per a monofilament is 0.1 GPa or more. Particularly, the present invention provides a continuous fiber of titania wherein the average diameter per a monofilament is from 5 to 50 $\mu$m and the average tensile strength per a monofilament is 0.5 GPa or more.

The present invention secondly provides a method for producing a continuous fiber of titania, which comprises adding water to an alcohol solution of a titanium alkoxide to carry out a hydrolysis reaction and a polymerization reaction of the titanium alkoxide, forming and depositing a polymer which is insoluble in the alcohol, dissolving the polymer in the presence of an organic solvent in which the polymer dissolves to form a spinning solution, spinning by using the solution to obtain a precursor fiber, and calcining the precursor fiber to obtain said continuous fiber.

The present invention thirdly provides a method of using the continuous fiber of titania of the above first embodiment as a carrier for carrying-type catalyst, a photocatalyst, a filter for high temperature, an electronic material and a reinforcing filler.

The present invention provides, fourth, a continuous fiber of titania wherein the average diameter per a monofilament is from 5 to 50 $\mu$m, the BET specific surface area is 10 $m^2$/g or more, the pore volume is 0.05 cc/g or more, the volume of pores having a pore diameter of not less than 10 angstroms is 0.02 cc/g or more, and the average tensile strength per a monofilament is 0.1 GPa or more.

The present invention provides as a fifth embodiment a method for producing a continuous fiber of titania which comprises adding water to an alcohol solution of a titanium alkoxide to carry out a hydrolysis reaction and a polymerization reaction of the titanium alkoxide, forming and depositing a polymer which is insoluble in the alcohol, dissolving the polymer in the presence of an organic solvent in which the polymer dissolves to form a spinning solution, spinning by using the solution to obtain a precursor fiber, subjecting the resulting precursor fiber to a water vapor treatment before and/or during calcination and calcining the precursor fiber to obtain said continuous fiber.

The present invention provides as a sixth embodiment a method of using the continuous fiber of titania of the above fourth embodiment as a carrier for carrying-type catalyst, a photocatalyst, a filter for high temperature, an electronic material or a reinforcing filler.

The present invention provides as a seventh embodiment a catalyst component-carrying titania fiber prepared by carrying a catalyst component on and/or in the continuous fiber of titania of the above first embodiment or of the above fourth embodiment.

The present invention provides as an eight embodiment a method for producing the catalyst component-carrying titania fiber which comprises the combination of steps of immersing the continuous fiber of titania of the above first embodiment or of the above fourth embodiment in a solution containing a catalyst component selected from a metal, its oxide and its complex oxides drying and calcinating the fiber.

DETAILED DESCRIPTION OF THE INVENTION

Figure 1:
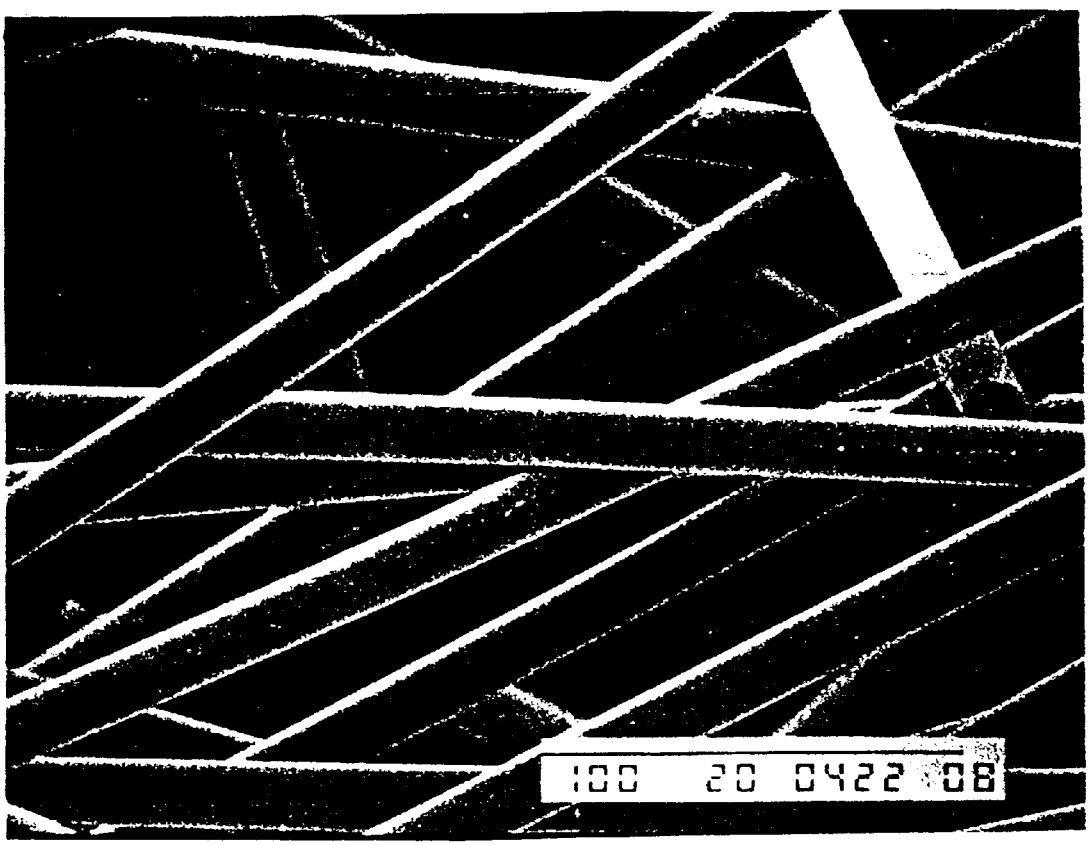
FIG. 1 shows the outer surface appearance of the catalyst component-carrying titania fiber of the present invention (see Example 22).

In the first embodiment of the present invention, the continuous fiber of titania has physical properties wherein the average diameter per a monofilament is from 5 to 50 μm and the average tensile strength per a monofilament is 0.5 GPa or more. The average tensile strength is preferably 0.85 GPa or more. Since the titania fiber has a high mecanical strength, it is preferably used when a titania fiber in a form of a fabric or a nonwoven fabric is needed. This titania fiber is a continuous fiber and has a length of at least several tens centimeters, and preferably has a length of 50 cm or more.

In the second embodiment of the present invention, the continuous fiber of titania has an average diameter per a monofilament of from 5 to 50 μm, a BET specific surface area of 10 m²/g or more, a pore volume of 0.05 cc/g or more, a volume of pores having a pore diameter of not less than 10 angstroms of 0.02 cc/g or more, and an average tensile strength per a monofilament of 0.1 GPa or more (hereinafter referred to as a "porous titania fiber"). It is obtained by subjecting a precursor fiber to a water vapor treatment before and/or during calcination in the production process. This titania fiber is also a continuous fiber and has a length of at least several tens centimeters, and preferably has a length of 50 cm or more.

When the porous titania fiber of the present invention is used as a catalyst carrier or used as a catalyst, it especially maintains a high catalytic activity for a long period of time because the BET specific surface area is of 10 m²/g or more.

Regarding the porous titania fiber of the present invention, the pore volume measured by the nitrogen adsorption method is 0.05 cc/g or more, and is preferably from 0.10 cc/g to 1.0 cc/g. When the porous titania fiber of the present invention is used as a catalyst carrier or used as a catalyst, it maintains high catalytic activity for a long period of time because the pore volume is 0.05 cc/g large.

In the porous titania fiber of the present invention, the volume of pores having a pore diameter of not less than 10 angstroms is 0.02 cc/g or more, and is preferably 0.04 cc/g or more.

The volume of pores having a pore diameter of not less than 10 angstroms is 0.02 cc/g or more, in paticular, the peak of a pore diameter is within the range from about 10 to 300 angstroms, and is preferably within the range from about 10 to 100 angstroms. Therefore, the porous titania fiber of the present invention is superior in catalytic retention and catalytic activity. Additionally, the porous titania fiber has a high mechanical strength enough to be used as a catalyst carrier. If the volume of pores having a pore diameter of not less than 10 angstroms is less than 0.02 cc/g, the catalyst may not sufficiently be impregnated in the pores, e.g., a sufficiently carried catalyst, whereby satisfactory catalytic activity can not be obtained. If said volume is less than 0.02 cc/g, the catalyst may also be physically separated from the titania fiber and the catalytic activity may not be maintained.

The porous titania fiber of the present invention exhibits an average tensile strength per a monofilament is 0.1 GPa or more, and is preferably 0.3 GPa or more. The porous titania fiber of the present invention has a high mechanical strength required as a catalyst carrier. When higher tensile strength is required, for example, when the titania fiber is used in the form of a fabric or a nonwoven fabric, the first continuous titania fiber having the high tensile strength of 0.5 of GPa or more of the present invention is preferably used.

A suitable titanium alkoxide for use in producing the titania fiber of the present invention is preferably represented by the general formula [1]:

  [1]

wherein R¹ represents an alkyl group having 1 to 4 carbon atoms and each of four R¹ in the formula [1] can be different from one another. Specific examples thereof include titanium tetramethoxide, titanium tetraethoxide, titanium tetra-n-propoxide, titanium tetra-iso-propoxide, titanium tetra-n-butoxide, titanium tetra-sec-butoxide, titanium tetra-tert-butoxide, titanium mono-methoxy-tri-iso-propoxide, titanium di-methoxy-di-iso-propoxide and the like. Among them, titanium tetra-iso-propoxide, whose R¹ in the general formula [1] is an isopropyl group, is preferable. In the case of those wherein the number of carbon atoms of R¹ in the general formula [1] exceeds 4, the content of the organic component in the precursor fiber increases and, therefore, the mechanical strength of the resulting titania fiber is liable to be reduced. Not only one kind of titanium alkoxide but also two or more kinds of titatium alkoxide can be used at the same time in the present invention.

A suitable alcohol for use in the present invention is preferably represented by the general formula [2]:

  [2]

wherein R² represents an alkyl group having 1 to 4 carbon atoms. Specific examples thereof include methanol, ethanol, isopropyl alcohol, n-buthylalcohol and the like. When the number of carbon atoms of R² in the general formula [2] exceeds 4, a boiling point of the alcohol is high and, therefore, it becomes difficult to remove the alcohol in the post-treatment step in the production process. The suitable boiling point is less than the boiling point for pentyl alcohol, and is less than about 140° C.

The production of the titania fiber of the present invention is characterized by adding water to an alcohnl solution of a titanium alkoxide to carry out the hydrolysis and polymerization reaction of the titanium alkoxide, thereby producing and depositing a polymer which is insoluble in the alcohol but dissolves in the presence of the other organic solvent. In the step of the hydrolysis and polymerization reaction of the titanium alkoxide by using the alcohol solution, when the hydrolysis and polymerization reaction is carried out by using a solvent other than the alcohol, e.g. ethers, in place of the alcohol, the resulting polymer is liable to have a three-dimensional network structure and is easily gelated in the form of incorporating the solvent and, therefore, a polymer having suitable polymerization degree like the polymer of the present invention can not be produced. The polymerization degree of the polymer in the present invention is a polymerization degree to the degree where the polymer is insoluble in the alcohol but dissolve in an organic solvent other than the alcohol.

In the production of the titania fiber of the present invention, an amount of the alcohol to be used relative to the titanium alkoxide may be an amount where the alkoxide and water does not become an immiscible state in the hydrolysis reaction and is not specifically limited, and is preferably within the range from about 0.5 to 50 mole per 1 mole of the titanium alkoxide. Even if the amount is too large, no problem arises, but the cost required to separate the alcohol from the alcohol suspension of the polymer in the post-treatment step becomes higher.

In the production of the titania fiber of the present invention, water is added to an alcohol solution of a titanium alkoxide to carry out a hydrolysis reaction and a polymerization reaction of the titanium alkoxide, thereby forming a polymer which is insoluble in the alcohol solution. In order to control the hydrolysis reaction and the polymerization reaction, a compound having active hydrogen may be contained in the alcohol solution. Examples thereof are an alkyl salicylate whose alkyl group has 1 to 4 carbon atoms, and a β-diketone which is represented by the general formula [4]:

$$R^4COCH_2COR^5 \qquad [4]$$

wherein $R^4$ and $R^5$, independently of each other, represent an alkyl or alkoxy group having 1 to 4 carbon atoms.

Specific examples thereof include β-diketone such as ethyl acetoacetate, isopropyl acetoacetate, and alkyl salicylate such as ethyl salicylate, methyl salicylate. By including the compound having active hydrogen in the alcohol solution, the hydrolysis reaction and the polymerization reaction of the titanium alkoxide are controlled. This makes it possible to improve the solubility of the polymer, in the presence of the organic solvent although the polymer is deposited in the alcohol.

In the present invention, an amount of the compound having active hydrogen to be contained in the alcohol solution is preferably from about 0.05 to 1.9 mole per 1 mole of the titanium alkoxide, and is more preferably from about 0.1 to 1.0 mole per 1 mole of the titanium alkoxide. When the amount of the compound having active hydrogen is smaller than about 0.05 mole per 1 mole of the titanium alkoxide, the effect of the compound having active hydrogen does not appear sufficiently. On the other hand, when the amount is larger than about 1.9 mole, it is liable that the hydrolysis reaction and the polymerization reaction are inhibited and, therefore, the polymerization does not proceed easily and that the residual amount of the organic component in the resulting polymer increases. As a result, the mechanical strength of the resulting titania fiber tends to be lowered.

In the production of the titania fiber of the present invention, the hydrolysis reaction and the polymerization reaction of the titanium alkoxide are carried out by adding water to the alcohol solution of the titanium alkoxide, thereby forming and depositing a polymer which is insoluble in the alcohol. An amount of water to be used may be an amount to the degree where the polymer is insoluble in the alcohol solution but dissolves in the presence of an organic solvent other than the alcohol. The amount is normally from about 1.5 to 4 mole per 1 mole of the titanium alkoxide, but is not specifically limited. It is enough if the amount of a difference [A–B], which is the difference between the amount [A] of water to be added to the alcohol solution of the titanium alkoxide and the amount [B] of water to be discharged out of the reaction system where the polymer is formed and deposited by the adding water to the alcohol solution before the polymer separated from the alcohol solution is dissolved in the presence of the organic solvent is about 1.5 to 1.95 moles per 1 mole of the titanium alkoxide. In other words, an amount of water substantially consumed during the hydrolysis reaction should be about 1.5 to 1.95 mole, and is preferably about 1.6 to 1.90 mole, per 1 mole of the titanium alkoxide. When the amount [B] of water to be discharged out of the reaction system is large, the amount [A] of water to be added can be used more than usual so that the amount of water substantially consumed during the hydrolysis reaction is adjusted to be the said amount. When the difference [A–B] of the amount of water, i.e. amount of water consumed substantially during the hydrolysis reaction is smaller than 1.5 mole, the polymerization degree of the resulting polymer is small and the amount of an organic component in the polymer is relatively large. When the resulting polymer is dissolved in the presence of the organic solvent to obtain a spinning solution and spinning is carried out by using the resulting solution, the mechanical strength of the resulting titania fiber is liable to be lowered. On the other hand, when the difference [A–B] of amount of water exceeds 1.95 mole, it tends to become difficult to dissolve the resulting polymer in the presence of the organic solvent.

In the production of the titania fiber of the present invention, when the amount of water to be added is suitable, the resulting polymer has high polymerization degree and contains a large amount of titanium-oxygen-titanium bonds and relatively contains small amount of the organic component. The titania fiber obtained by spinning this polymer has high mechanical strength.

In the production of the titania fiber of the present invention, water is not directly added normally but preferably added by a solution prepared by previously diluting water with the same kind of an alcohol as that in which the titanium alokoxide is dissolved. A concentration of water in the alcohol solution, in which water is diluted, is preferably about 1 to 50% by weight e.g. 99–50% by weight of the selected alcohol. When water is directly added, the reaction partially proceeds in the reaction system and a polymer which is insoluble in the presence of the organic solvent is sometimes deposited.

The temperature when water is added to the alcohol solution of the titanium alkoxide and when the hydrolysis reaction and the polymerization reaction of the titanium alkoxide are carried out is not specifically limited, but may be within the range from 0° C. to a boiling point of the alcohol to be used. When a fast reaction rate is desired, a high reaction temperature is preferable. The hydrolysis and polymerization reaction may be carried out under reflux at the boiling point after the alcohol solution in which water is diluted is added at a room temperature, e.g. about 25° C.

From the industrial point of view, a high concentration of titanium in the reaction system is preferable. Therefore, a diluted solution of water with alcohol is preferably added to the alcohol solution of the titanium alkoxide at a temperature of the boiling point of the alcohol in which the titanium alkoxide is dissolved, and is preferably added while the alcohol is discharged out of the reaction system in the same amount as that of the alcohol which is added with water to inhibit a decrease of concentration of titanium due to the addition of the solution of water.

The polymer deposited in the alcohol solution by the hydrolysis and polymerization reaction is dissolved in the presence of the organic solvent, as it is in the suspended state or after partially or completely removing the alcohol to form a spinning solution.

The method of partially or completely removing the alcohol from the alcohol suspension of the polymer is not particularly limited, and examples thereof include methods by means of filtration, centrifugation, concentration with heating, concentration under reduced pressure and the like. If necessary, drying may be conducted at this stage with heating or under reduced pressure.

In the step of dissolving the polymer in the presence of the organic solvent, preferably, all of the alcohol is substantially removed from the alcohol suspension of the polymer and the polymer is then dissolved in the presence of the organic solvent. When the alcohol is partially removed from the suspension and the polymer is dissolved in the presence of the organic solvent, water contained in the suspension after the alcohol was partially removed is preferably removed from the reaction system before the polymer is dissolved. Various methods for removing water from the alcohol suspension are suitable, such as removing the alcohol and water simultaneously under heating and/or reduced pressure after adding the alcohol containing no water to the suspension.

The organic solvent which is used for dissolving the polymer is not limited as long as the polymer can be dissolved therein. Suitable organic solvents are ethers, aromatic hydrocarbons and the like. Since the organic solvent is a main solvent in the spinning solution and its boiling point effects the properties of a precursor fiber, an organic solvent whose boiling point is from about 40° C. to about 120° C. is preferably used. Examples of the preferable organic solvent include tetarhydrofuran, diethyl ether, toluene and the like. A high-boiling point solvent is not preferable.

The amount of the organic solvents to be used in the solution in which the polymer is dissolved is preferably about 25 to about 90% by weight, and is more preferably about 50 to about 80% by weight based on the solvents consisting essentially of the said alcohol, the said compound having active hydrogen and the said organic solvent.

The polymer concentration in the solution in which the polymer is dissolved is preferably from about 50 to about 80% by weight based on the solution. When the polymer concentration is lower than this range, the concentration may be adjusted by removing the organic solvent under heating an/or reduced pressure to concentrate the solution to within the above range. The spinning solution is obtained by way of adjusting the polymer concentration to within the desired concentration range. When spinning is conducted, a viscosity of the spinning solution is also adjusted and controlled. A suitable viscosity of the spinning solution is within the range from about 10 to about 2000 poise, and is preferably from about 20 to about 500 poise. This viscosity can be controlled by adjusting the concentration of the polymer and/or adjusting a temperature of the spinning solution.

The precursor fiber can be obtained by using this spinning solution whose polymer concentration and viscosity were adjusted. The method of spinning is not limited and, for example, known spinning method such as nozzle extrusion spinning, centrifugal spinning, blow spinning, etc. can be applied. When spinning is conducted, the precursor fiber can also be stretched by using a rotating roller, a high-speed air current and the like. It is preferable to select a proper spinning atmosphere and to adjust the temperature and the humidity of the blowing air in order to obtain a desired fiber.

The above-mentioned method comprising steps of adding water to the alcohol solution of the titanium alkoxide to form a polymer due to the hydrolysis and polymerization reaction, optionally separating the polymer from the alcohol solution and dissolving the resulting polymer in the presence of the organic solvent to produce a spinning solution can be carried out not only by a batch but also by a continuous method.

The precursor fiber obtained by spinning is calcined after subjecting it to an optional pretreatment such as a water vapor treatment, a thermohydro treatment, an acid treatment or a treatment in combination thereof.

The above pretreatment is particularly essential to obtain the porous titania fiber of the present invention, i.e. continuous fiber of titania having physical properties wherein an average diameter per a monofilament is from 5 to 50 μm, a BET specific surface area is 10 m²/g or more, a pore volume is 0.05 cc/g or more, a volume of pores having a pore diameter of not less than 10 angstroms is 0.02 cc/g or more and an average tensile strength per a monofilament is 0.1 GPa or more. The water vapor treatment includes treating the precursor fiber obtained by spinning with water vapor at a temperature of about 80 to about 300° C. under an atmosphere having a water vapor partial pressure of about 0.3 atm or more, preferably from about 0.3 to about 20 atm for not less than 0.5 hours, preferably from about 1 to about 24 hours. The higher the temperature and/or the water vapor partial pressure of the water vapor treatment is, the shorter the required treating time becomes. When the treating temperature is lower than about 80° C., a long-time treatment is required even if the water vapor partial pressure is high and it is not preferable, industrially. When the water vapor partial pressure is less about 0.3 atm, a long-time treatment is required.

In the present invention, the water vapor treatment of the precursor fiber is normally conducted before calcination. But when the above conditions of temperature, water vapor partial pressure and treating time can be applied, the water vapor treatment can be incorporated into the calcination step and can be carried out during calcination.

In the method for producing the porous titania fiber of the present invention, the reason why a porous titania fiber having a large pore volume can be obtained by the pretreatment like the water vapor treatments but is considered as follows. That is, since the precursor fiber obtained by spinning contains an organic component derived from an organic group of a solvent and a polymer side chain, when the precursor fiber is subjected to the pretreatment like the water vapor treatment, the polymer in the fiber is further hydrolyzed and the organic component of the side chain comes off to change into an OH group and, furthermore, a number of a —Ti—O—Ti— bond increases due to the polymerization reaction. When the organic component comes off and the —Ti—O—Ti— bond is formed, a lot of pores are formed in the fiber and the size of the pores is comparatively large. Therefore, the pores are remained in the calcination step, which results in porous fiber.

Almost all of the organic component in the precursor fiber comes off at 300° C. or less in the calcination step. Accordingly, the water vapor treatment is preferably carried out at a temperature of about 300° C. or less, e.g. about 80 to about 300° C., and is more preferably about 80 to about 200° C.

In the present invention, a porous titania fiber having high mechanical strength can be produced by adding water to an alcohol solution of a titanium alkoxide to carry out a hydrolysis reaction and a polymerization reaction of the titanium alkoxide, dissolving the resulting polymer in the presence of the organic solvent, spinning by using the resulting polymer-in-organic solvent solution as a spinning solution, subjecting the resulting precursor fiber to a pretreatment such as a water vapor treatment, followed by calcination, and when a titania fiber having higher mechanical strength is required, a silicon compound may be included in the spinning solution.

The silicon compound is not limited as long as it can be uniformly mixed and dispersed in the spinning solution. The silicon compound is preferably an alkyl silicate represented by the general formula [3]:

$$Si_nO_{n-1}(OR^3)_{2n+2} \qquad [3]$$

wherein $R^3$ represents an alkyl group having 1 to 4 carbon atoms, and n represents an integer of 1 or more. Each of $R^3$ in the formula [3] can be different from one another. A particularly preferable alkyl silicate is an ethyl silicate of the general formula [3] wherein $R^3$ is an ethyl group and n is 4 to 6.

The amount of the silicon compound to be used is preferably equivalent to the amount wherein the silica content in the titania fiber obtained after calcination is from about 1 to 40% by weight, and is more preferably form about 5 to about 30% by weight, based on the fiber. When the silica content exceeds 40% by weight based on the fiber, the mechanical strength of the resulting titania fiber is not increased and the content of the titania component is relatively decreased. Therefore, when using the titania fiber whose silica content exceeds 40% as a catalyst carrier, the catalytic activity is liable to be deteriorated, unfavorably.

When the silicon compound is used for producing the continuous fiber of titania of the present invention, it is contained in the spinning solution before spinning. Examples of the method of containing the silicon compound includes a method of containing a silicon compound in an alcohol solution of a titanium alkoxide or in an alcohol solution of the titanium alkoxide and a compound having active hydrogen, and a method of containing a silicon compound in the organic solvent solution of the polymer on and/or after dissolving the polymer obtained by the hydrolysis and the polymerization reaction of the titanium alkoxide in the presence of the organic solvent and the like.

In the production of the continuous fiber of titania of the present invention, the precursor fiber obtained by spinning is calcined after subjecting it to an optional pretreatment such as a water vapor treatment.

The calcination method is not specifically limited, and includes a method of calcining in air and the like. The titania fiber obtained by calcination may be optionally calcined again. During the calcination, a tension may be applied to the precursor fiber and/or titania fiber.

The calcination temperature is not specifically limited, and is preferably within the range from about 500 to about 1100° C. When the calcination temperature is lower than about 500° C., the resulting fiber is porous but the mechanical strength tends to decrease. On the other hand, when it is higher than about 1100° C., the porosity tends to decrease. As described, the higher the calcination temperature is, the more the porosity tends to decrease, that is, the more the BET specific surface area and pore volume tend to be small. However, when the precursor fiber obtained by spinning is subjected to a water vapor treatment at high temperature under an atmosphere of high water vapor partial pressure for a long time, the porosity can be maintained even if it is calcined at high temperature.

As the calcination temperature becomes higher, the titania fiber is changed from an amorphous fiber into a fiber of an anatase-form crystal, then into a fiber of a rutile-form crystal during the calcination. A crystalization temperature and a transition temperature at which the anatase-form crystal is changed into the rutile-form crystal vary depending on the silica content in the fiber. Accordingly, a titania fiber having a desired crystal form can be obtained by controlling the calcination temperature and the silica content. For example, regarding a titania fiber containing no silica, a fiber having an anatase-form crystal can be obtained by calcination at 600° C., and a fiber having a rutile-form crystal can be obtained by calcination at 900° C., respectively. Regarding a titania fiber whose silica content is about 15% by weight based on the fiber, a fiber having an anatase-form crystal can be obtained by calcination at 900° C., and a fiber having a rutile-form crystal can be obtained by calcination at 1100° C., respectively.

Using the above method, according to the method of the present invention, a continuous fiber of titania containing an anatase-form titanium oxide as a main component, which constitutes at least 50% of the whole content of a crystal, can be obtained. A titania fiber of a rutile-form titanium oxide and a mixture of an anatase-form titanium oxide and a rutile-form titanium oxide can be obtained, as well. Every titania fiber has number of advantages and can be used for various purposes. When a titania fiber is used as a catalyst, however, a titania fiber of an anarase-form crystal is preferable in view of the catalytic activity.

The porous titania fiber obtained by the above method exhibits excellent characteristics, and particularly so with respect to a catalyst and a catalyst carrier applications.

The titania fiber obtained by the present invention is a continuous fiber in the form of a long fiber, and the fiber is applied to various uses after forming into a short fiber by cutting into a suitable length, if necessary.

The catalyst component-carrying titania fiber of the present invention can be obtained by carrying the catalyst component on and/or in the titania fiber.

The preferred catalyst component will differ depending on the use. Examples of the catalyst component include a metal, an oxide of a metal, or a complex oxide of a metal, wherein the metal is from Group II a, VI a, V a, VI a, VIII, III b or V b of the Periodic Table of Elements. Representative metals include those selected from the group consisting of V, W, Al, As, Ni, Zr, Mo, Ru, Mc, Ca and Pt. The continuous fiber of titania of the present invention can support not only one kind of catalyst component but also two or more kinds of components at once. A metal selected from the group consisting of V, W, Mo, an oxide of any thereof and a complex oxide of any thereof are preferable for use as catalyst components of the catalyst for reduction of nitrogen oxide.

The method for producing the catalyst component-carrying titania fiber is not specifically limited and, for example, there is a method comprising the combination of steps of immersing a continuous fiber of titania of the present invention in a solution containing a catalyst component with or without evacuating to permeate the solution positively into pores of the fiber, removing the fiber, drying the fiber and calcining the fiber. The optimum calcination temperature will differ depending on the use, i.e. kind of the catalytic reaction, reaction temperature, etc., and is not specifically limited. For example, it is from about 200 to about 1000° C. In the case of using some catalyst components, the calcination at high temperature may cause deterioration of the catalytic activity due to sintering of catalyst particles. Therefore, the calcination temperature may be appropriately decided according to the kind of the catalyst component.

Regarding the catalyst component-carrying titania fiber of the present invention, an optimum amount of the catalyst component to be carried based on the titania fiber will differ depending on the kind of use, i.e. the catalytic reaction, and it is generally from about 0.5 to about 50% by weight in terms of a metal, an oxide of any thereof and a complex oxide of any therof, base on the titania fiber. When the fiber is used as a catalyst for reduction of a nitrogen oxide, the amount is preferably from about 0.5 to about 30% by weight based on the titania fiber. When the amount is less than about 0.5% by weight, the active surface area of the fiber tends to become small and the catalytic activity tends not to be sufficient. When the amount is larger than about 50% by weight, quite a large amount of the catalyst component is carried at the various positions, e.g. not only inside of the fiber but also the outer surface of the fiber and, therefore, the catalyst component tends to come off and the active surface area tends not to increase any more, and it is unfavorable in view of the cost.

As described above in detail, according to the present invention, a continuous fiber of titania having excellent spinning stability and high mechanical strength can be obtained by an industrially easy specific production method and, furthermore, a continuous fiber of titania having a remarkably large specific surface area and a remarkably large pore volume, which is excellent as a catalyst and a catalyst carrier, can be obtained by subjecting the precursor fiber obtained in the said method to a water vapor treatment before calcination and/or during calcination. Also, according to the present invention, a catalyst component-carrying titania fiber having a large active surface area and a large pore volume can be obtained, wherein catalyst component thereof hardly comes off and high activity thereof can be maintained for a long period of time. Accordingly, the industrial utilization value of the titania fiber and catalyst component-carrying titania fiber of the present invention is remarkably large, especially they are used as the catalyst for reduction of a nitrogen oxide, oxidation of an organic compound, e.g. the oxidation of benzene to obtain maleic anhydride, and the like.

Continuous fibers of titania, catalyst component-carrying titania fibers therefrom, the methods of preparing both of the foregoing and the methods of using both of the foregoing of the present invention are described in Japanese application nos. 08-348930, filed Dec. 26, 1996, 09-073713, filed Mar. 26, 1997, and 09-109627, filed Apr. 25, 1997, the complete disclosures of which are incorporated herein by reference.

EXAMPLES

The following non-limiting Examples and Comparative Examples further illustrate the present invention in detail.

In the Examples and Comparative Examples, the measurement of a concentration of water in alcohol, an average diameter per a monofilanment, an average tensile strength per a monofilament, a crystal form of the fiber, a BET specific surface area, a pore volume, SEM observation and EPMA analysis were conducted in the following manners.

Concentration of water in alcohol: The concentration of water in a sample was measured by using a Karl Fischer moisture content meter (Model MKS-210, manufactured by Kyoto Denshi Co., Ltd.)

Average diameter: A fiber was observed by using an optical microscope and twenty monofilaments observed in the field of view of the fiber were selected at random to be measured. A fiber diameter of each monofilament was measured and the average value thereof was taken as the average diameter per a monofilament of the filber.

Average tensile strength: Using an automatic monofirament tensile tester (control section: Model AMF-C, tensile device section: TENSILON, Model UTM-2-20, manufactured by Toyo Boldwin Co., Ltd.), a tensile test of a monofilament was conducted under the conditions of a length of the monofilament of 25 mm and a stress rate of 1 mm/min. A strength at which a monofilament is broken was measured, and the average value of thirty measurements was taken as the average tensile strength per a monofilament of the fiber.

Crystal form: A fiber was slightly ground in a mortar and then analyzed by using a X-ray diffractmeter (Model RAD-IIA, manufactured by Rigaku Denki Co., Ltd.) to observe the crystal form of the fiber.

BET specific surface area: A fiber was slightly ground in a mortar, and then a BET specific surface area was measured by using Micrometrics FLOWSORB-II Model 2300 (manufactured by Shimadzu Corporation).

Pore volume: A fiber was slightly ground in a mortar, and then a pore volume was measured with a nitrogen gas by using a gas adsorption/desorption analyser OMUNISOAP Model 360 (manufactured by COULTER Co.).

SEM observation: A fiber was mounted on a specimen carrier and, after gold deposition was conducted by using an ion sputtering device (Model JFC-1100E, manufactured by Nippon Denshi Co., Ltd.), the fiber surface and fractured surface of the cross section were observed by a scanning electron microscope (Model JSM-T300, manufactured by Nippon Denshi Co., Ltd.).

EPMA analysis: A fiber was embedded in a room temperature-type curing resin and, after curing, the embedded fiber was cut and elemental analysis of the fractured surface was conduct by an electron probe microanalyser (Model EPM-810, manufactured by Shimadzu Corporation).

Example 1

Titanium isopropoxide (1st grade reagent, manufactured by Wako Pure Pharmaceuticals Co., Ltd.) (300.0 g) and ethyl acetoacetate (extra pure reagent, manufactured by Wako Pure Pharmaceuticals Co., Ltd.) (54.9 g) were dissolved in isopropyl alcohol (extra pure reagent, manufactured by Wako Pure Pharmaceuticals Co., Ltd.) (700.0 g) and the solution was refluxed under a nitrogen atmosphere for 1 hour to prepare an alcohol solution of titanium isopropoxide. At this time, a molar ratio of ethyl acetoacetate to titanium isopropoxide is 0.40. Separately, pure water (51.0 g) was mixed with isopropyl alcohol (460.2 g) to prepare an alcohol solution having a water concentration of 10% by weight. An amount of water in the solution is 2.7 mole ratio based on titanium isopropoxide used.

The alcohol solution of titanium isopropoxide was heated in a nitrogen atmosphere and refluxed under boiling and the alcohol solution of water was added into the solution of titanium isopropoxide with distilling the alcohol under stirring. A distillation rate of the alcohol was adjusted to a rate which is almost the same as an addition rate of the alcohol solution of water. An addition period of time of the alcohol solution of water was adjusted to 135 min.

The deposition of a polymer started when an amount of added water was 2.1 mole per 1 mole of used titanium isopropoxide. Once the total selected amount of water was added, the solution was in a slurry state. The amount of water in the distilled alcohol was 0.29 mole per 1 mole of titanium isopropoxide used.

After the slurry was refluxed for 1 hour, the alcohol in the slurry was distilled with heating and a polymer was dried by continuously heating with an oil bath at 143° C. until the alcohol can not be distilled. The polymer after drying was a yellow powder and the weight was 144 g. The amount of water in the distilled alcohol was 0.61 mole per 1 mole of titanium isopropoxide used. Accordingly, a difference between the amount of water added and the amount of water discharged together with the alcohol out of the reaction system was 1.8 mole [=2.7−(0.29+0.61)] per 1 mole of titanium isopropoxide used.

Then, the polymer was dissolved in tetrahydrofuran (extra pure reagent, manufactured by Wako Pure Pharmaceuticals Co., Ltd.) (460 g) and ethyl silicate 40 (manufactured by Tama Kagaku Kogyo Co., Ltd.) (37.2 g) was added into the tetrahydrofuran solution and the solution was refluxed for 1 hour. The said amount of ethyl silicate added is equivalent to the amount wherein the silica content in the titania fiber which is obtained after spinning, a water vapor treatment and calcination is 15% by weight based on the fiber.

After the tetrahydrofuran solution of the polymer was filtered through a Teflon membrane filter having a pore diameter of 3 μm, the filtrate was concentrated by distilling tetrahydrofuran with heating to obtain 200 g of a spinning solution. A viscosity of the spinning solution was 50 poise at 40° C.

The spinning solution at 40° C. was extruded into an air atmosphere (40° C., relative humidity (RH):60%) through a nozzle having a diameter of 50 μm with a nitrogen gas under a pressure of 20 kg/cm$^2$, followed by hauling off at a haul-off rate of 70 m/min to obtain a precursor fiber.

The resulting precursor fiber was put in a thermo-hygrostat (70° C., RH:70%) and treated with water vapor for 30 min. After the temperature was raised at a rate of 200° C./hour, the precursor fiber was calcined at 900° C. for 30 min to obtain a titania fiber.

The resulting titania fiber had an average diameter of 15 μm per a monofilament and a high average tensile strength of 1.4 Gpa per a monofilament. According to the X-ray diffraction (XRD) analysis, the fiber was an anatase-form titanium oxide and only a peak of an anatase-form crystal was recognized.

Example 2

According to the same manner as that described in Example 1 except for changing the calcination temperature after the water vapor treatment to 1100° C., a titania fiber was obtained.

The resulting titania fiber had an average diameter of 15 μm per a monofilament and a high average tensile strength of 1.1 Gpa per a monofilament. According to the XRD analysis, the fiber was rutile-form titanium oxide and only a peak of a rutile-form crystal was recognized.

Example 3

Titanium isopropoxide (300.0 g) and ethyl acetoacetate (54.9 g) were dissolved in isopropyl alcohol (128.6 g) and the solution was refluxed under a nitrogen atmosphere for 1 hour to prepare an alcohol solution of titanium isopropoxide. Separately, pure water (51.0 g) was mixed with isopropyl alcohol (1653.3 g) to prepare an alcohol solution having a water concentration of 3% by weight.

The alcohol solution of titanium isopropoxide was heated in a nitrogen atmosphere and refluxed under boiling and the alcohol solution of water was added into the solution of titanium isopropoxide with distilling the alcohol under stirring. A distillation rate of the alcohol was adjusted to a rate which is almost the same as an addition rate of the alcohol solution of water. An addition period of time of the alcohol solution of water was adjusted to 140 min. When the total amount of water was added, the solution was in slurry state.

After the slurry was refluxed for 1 hour, the alcohol in the slurry was distilled with heating and a polymer was dried by continuously heating with an oil bath at 143° C. until the alcohol can not be distilled. According to the same manner as that described in Example 1, the amount of water discharged out of the reaction system was measured. As a result, a difference between the amount of water added and the amount of water discharged out of the reaction system was 1.78 mole per 1 mole of titanium isopropoxide used.

Using the polymer after drying, according to the same manner as that described in Example 1, dissolution in tetrahydrofuran, addition of ethyl silicate, reflux, filtration and concentration were conducted to obtain a spinning solution. The spinning, the water vapor treatment and calcination were carried out to obtain a titania fiber, as in Example 1.

Physical properties of the titania fiber thus obtained were examined. As a result, the crystal form of the fiber was an anatase and, furthermore, an the average diameter was 16 μm per a monofilament and the average tensile strength was 1.2 Gpa per a monofilament.

Example 4

According to the same manner as that described in Example 1, the alcohol solution of titanium isopropoxide and alcohol solution of water having a water concentration of 10% by weight were prepared to obtain a slurry of a polymer.

The slurry was concentrated by using an oil bath at 80° C. and an evaporator and further vacuum-dried to obtain a polymer powder.

After the polymer powder was dissolved in tetrahydrofuran (270 g), ethyl silicate 40 (37.2 g) was added into the tetrahydrofuran solution and the solution was refluxed. According to the same manner as that described in Example 1, the solution was filtered and the filtrate was concentrated to prepare a spinning solution and then the polymer was spun by using the spinning solution to obtain a precursor fiber. According to the same manner as that described in Example 1, the precursor fiber was treated with water vapor and then calcined to obtain a titania fiber.

In this method, a difference between the amount of water added and the amount of water discharged out of the reaction system was 1.72 mole per 1 mole of titanium isopropoxide used. The crystal form of the resulting titania fiber was an anatase and, furthermore, the average diameter was 16 μm per a monofilament and the average tensile strength was 1.3 Gpa per a monofilament.

Example 5

Titanium isopropoxide (300.0 g) and ethyl acetoacetate (54.9 g) were dissolved in isopropyl alcohol (73.6 g) and the solution was refluxed under a nitrogen atmosphere for 1 hour to prepare an alcohol solution of titanium isopropoxide. Separately, pure water (34.2 g) was mixed with isopropyl alcohol (79.8 g) to prepare an alcohol solution having a water concentration of 30% by weight. The amount of water is 1.8 mole per 1 mole of titanium isopropoxide used.

The alcohol solution of titanium isopropoxide was cooled in a nitrogen atmosphere to 10° C. and the above alcohol solution of water was added into the solution of titanium isopropoxide under stirring. The addition period of time was adjusted to be 45 min.

When the total amount of water was added, the solution was transparent. Deposition of the polymer was started by heating. On reaching the reflux temperature, the solution was in slurry state.

After the slurry was refluxed for 1 hour, the alcohol was distilled with heating and a polymer was dried by continuously heating with an oil bath at 120° C. until the alcohol can not be distilled.

Then, the polymer powder was dissolved in tetrahydrofuran (270 g) and ethyl silicate 40 (37.2 g) was added into the tetrahydrofuran solution and the solution was refluxed for 1 hour. According to the same manner as that described in Example 1, the solution was filtered and the filtrate was concentrated to prepare a spinning solution and the polymer was spun by using the spinning solution to obtain a precursor fiber. According to the same manner as that described in Example 1, the precursor fiber was treated with water vapor and then calcined to obtain a titania fiber.

In this method, a difference between the amount of water added and the amount of water discharged out of the reaction system was 1.69 mole per 1 mole of titanium isopropoxide used. The crystal form of the resulting titania fiber was an anatase and, furthermore, the average diameter was 15 μm per a monofilament and the average tensile strength was 0.9 Gpa per a monofilament.

Example 6

Titanium isopropoxide (300.0 g) and ethyl acetoacetate (68.7 g) were dissolved in isopropyl alcohol (700.0 g) and the solution was refluxed under a nitrogen atmosphere for 1 hour to prepare an alcohol solution of titanium isopropoxide. At this time, a molar ratio of ethyl acetoacetate to titanium isopropoxide is 0.50. Separately, pure water (56.4 g) was mixed with isopropyl alcohol (1837.8 g) to prepare an alcohol solution having a water concentration of 3% by weight. The amount of water is 3.0 mole per 1 mole of titanium isopropoxide used.

The alcohol solution of titanium isopropoxide was heated and refluxed under boiling in a nitrogen atmosphere and, at the same time, an alcohol solution having a water concentration of 3% by weight was added into the solution of the titanium isopropoxide under stirring with distilling the alcohol. The distillation rate of the alcohol was adjusted to a rate which is almost the same as an addition rate of the alcohol solution of water, and the addition period of time was 160 min. When the total amount of water was added, the solution was in slurry state.

After the slurry was refluxed for 1 hour, the alcohol was distilled with heating to obtain 305 g of a concentrated slurry.

Then, the concentrated slurry was dissolved in tetrahydrofuran (460 g) and ethyl silicate 40 (37.2 g) was added into the tetrahydrofuran solution and the solution was refluxed for 1 hour. According to the same manner as that described in Example 1, a spinning solution was prepared. According to the same manner as that described in Example 1, the polymer was spun by using the spinning solution, followed by the water vapor treatment and calcination to obtain a titania fiber.

In this method, a difference between the amount of water added and the amount of water discharged out of the reaction system was 1.84 mole per 1 mole of titanium isopropoxide used. The crystal form of the resulting titania fiber was an anatase and, furthermore, the average diameter was 16 μm per a monofilament and the average tensile strength was 1.1 Gpa per a monofilament.

Example 7

Titanium isopropoxide (300.0 g) and ethyl acetoacetate (54.9 g) were dissolved in isopropyl alcohol (700.0 g) and the solution was refluxed under a nitrogen atmosphere for 1 hour to prepare an alcohol solution of titanium isopropoxide. To the alcohol solution, ethyl silicate 40 (37.2 g) was added, and the solution was further refluxed for 1 hour.

Separately, pure water (51.0 g) was mixed with isopropyl alcohol (460.2 g) to prepare an alcohol solution having a water concentration of 10% by weight. The alcohol solution of titanium isopropoxide was heated and refluxed under boiling in a nitrogen atmosphere and, at the same time, an alcohol solution having a water concentration of 10% by weight was added into the solution of the titanium isopropoxide under stirring with distilling the alcohol. When the total amount of water was added, the solution was in slurry state.

After the slurry was refluxed for 1 hour, the alcohol was distilled with heating. Furthermore, the slurry was continuously heated with an oil bath at 143° C. until the distilled solution can not be obtained to dry the polymer.

The polymer was dissolved in tetrahydrofuran (270 g) with heating and, according to the same manner as that described in Example 1, the solution was filtered and concentrated to prepare a spinning solution and then the polymer was spun by using the spinning solution to obtain a precursor fiber. According to the same manner as that described in Example 1, the precursor fiber was treated with water vapor and then calcined to obtain a titania fiber.

In this method, a difference between the amount of water added and the amount of water discharged out of the reaction system was 1.83 mole per 1 mole of titanium isopropoxide used. The crystal form of the resulting titania fiber was an anatase and, furthermore, the average fiber diameter was 15 μm per a monofilament and the average tensile strength was 0.9 Gpa per a monofilament.

Example 8

Titanium isopropoxide (300.0 g) and ethyl acetoacetate (13.7 g) were dissolved in isopropyl alcohol (700.0 g) and the solution was refluxed under a nitrogen atmosphere for 1 hour to prepare an alcohol solution of a titanium isopropoxide. At this time, a molar ratio of ethyl acetoacetate to titanium isopropoxide is 0.10. Separately, pure water (46.9 g) was mixed with isopropyl alcohol (1530.5 g) to prepare an alcohol solution having a water concentration of 3% by weight. The amount of water is 2.5 mole per 1 mole of titanium alkoxide used.

The alcohol solution of titanium isopropoxide was heated in a nitrogen atmosphere and refluxed under boiling and the alcohol solution of water was added into solution of titanium isopropoxide with distilling the alcohol under stirring. When the total amount of water was added, the solution was in slurry state.

After the slurry was refluxed for 1 hour, the alcohol was distilled with heating. Furthermore, the slurry was continuously heated with an oil bath at 143° C. until the distilled solution can not be obtained to dry the polymer.

After the polymer powder was dissolved in tetrahydrofuran (460 g), ethyl silicate 40 (37.2 g) was added into the tetrahydrofuran solution and the solution was refluxed for 1 hour. According to the same manner as that described in Example 1, the solution was filtered and concentrated to prepare a spinning solution and then the polymer was spun by using the spinning solution to obtain a precursor fiber. According to the same manner as that described in Example 1, the precursor fiber was treated with water vapor and then calcined to obtain a titania fiber.

In this method, a difference between the amount of water added and the amount of water discharged out of the reaction system was 1.67 mole per 1 mole of titanium isopropoxide used. The crystal form of the resulting titania fiber was an anatase and, furthermore, the average diameter was 16 μm per a monofilament and the average tensile strength was 1.0 GPa.

Example 9

Titanium isopropoxide (300.0 g) and ethyl acetoacetate (24.7 g) were dissolved in isopropyl alcohol (700.0 g) and the solution was refluxed under a nitrogen atmosphere for 1 hour to prepare an alcohol solution of a titanium isopropoxide. At this time, a molar ratio of ethyl acetoacetate to titanium isopropoxide is 0.18. Separately, pure water (46.9 g) was mixed with isopropyl alcohol (1530.5 g) to prepare an alcohol solution having a water concentration of 3% by weight. The amount of water is 2.5 mole per 1 mole of titanium alkoxide used.

The alcohol solution of titanium isopropoxide was heated in a nitrogen atmosphere and refluxed under boiling and the alcohol solution of water was added into solution of titanium isopropoxide with distilling the alcohol under stirring. When the total amount of water was added, the solution was in slurry state.

After the slurry was refluxed for 1 hour, the alcohol was distilled with heating. Furthermore, the slurry was continuously heated in an oil bath at 143° C. until the distilled solution can not be obtained to dry the polymer.

The polymer was dissolved in tetrahydrofuran (460 g) with heating and, after filtering through a Teflon membrane filter having a pore diameter of 3 μm, tetrahydrofuran was distilled by heating to obtain a spinning solution. According to the same manner as that described in Example 1 except for using this spinning solution and changing the calcination temperature to 600° C., a spinning, a water vapor treatment and calcination were conducted to obtain a titania fiber.

In this method, a difference between the amount of water added and the amount of water discharged out of the reaction system was 1.69 mole per 1 mole of titanium isopropoxide used. The crystal form of the resulting titania fiber was an anatase and, furthermore, the average diameter was 17 μm per a monofilament and the average tensile strength was 0.8 Gpa per a monofilament.

Example 10

According to the same manner as that described in Example 9 except for changing the calcination conditions from 600° C.×30 min to 900° C.×30 min. a titania fiber was obtained.

In this method, the crystal form of the resulting fiber was a rutile and, furthermore, the average diameter was 17 μm per a monofilament and the average tensile strength was 0.7 Gpa per a monofilament.

Example 11

According to the same manner as that described in Example 8 except for changing the amount of ethyl acetoacetate to 34.3 g (molar ratio of ethyl acetoacetate to titanium isopropoxide is 0.25) and changing the amount of ethyl silicate 40 to 90.4 g (this amount of ethyl silicate is equivalent to an amount wherein the silica content in the titania fiber to be obtained is 30% by weight based on the fiber.

In this method, a difference between the amount of water added and the amount of water discharged out of the reaction system was 1.68 mole per 1 mole of titanium isopropoxide used. The crystal form of the resulting fiber was an anatase and, furthermore, the average diameter was 15 μm per a monofilament and the average tensile strength was 0.9 Gpa per a monofilament.

Example 12

According to the same manner as that described in Example 8 except for changing the amount of ethyl acetoacetate to 137.3 g (molar ratio of ethyl acetoacetate to titanium isopropoxide is 1.00), a titania fiber was obtained.

In this method, a difference between the amount of water added and the amount of water discharged out of the reaction system was 1.76 mole per 1 mole of titanium isopropoxide used. The crystal form of the resulting fiber was an anatase and, furthermore, the average diameter was 15 μm per a monofilament and the average tensile strength was 0.8 Gpa per a monofilament.

Example 13

Titanium isopropoxide (200.0 g) was dissolved in isopropyl alcohol (371.4 g) to prepare an alcohol solution of titanium isopropoxide. Separately, pure water (33.8 g) was mixed with isopropyl alcohol (1103.0 g) to prepare an alcohol solution having a water concentration of 3% by weight. The amount of water is 2.7 mole per 1 mole of titanium alkoxide used.

The alcohol solution of titanium isopropoxide was heated in a nitrogen atmosphere and refluxed under boiling and the alcohol solution of water was added into solution of titanium isopropoxide with distilling the alcohol under stirring. When the total amount of water was added, the solution was in slurry state. After the slurry was refluxed for 1 hour, the alcohol was distilled with heating. Furthermore, the slurry was continuously heated with an oil bath at 130° C. until the distilled solution can not be obtained to dry the polymer.

The polymer was dissolved in tetrahydrofuran (270 g) with heating and etyl silicate 40 (24.8 g ) was added into the tetrahydrofuran solution and the solution was refluxed for 1 hour. After filtering through a Teflon membrane filter having a pore diameter of 3 μm, tetrahydrofuran was distilled by heating to obtain a spinning solution. Then, the polymer was spun by using the spinning solution to obtain a precursor fiber. According to the same manner as that described in Example 1, the precursor fiber was treated with water vapor and then calcined to obtain a titania fiber.

In this method, a difference between the amount of water added and the amount of water discharged out of the reaction system was 1.68 mole per 1 mole of titanium isopropoxide used. The crystal form of the resulting titania fiber was an anatase and, furthermore, the average diameter was 16 μm per a monofilament and the average tensile strength was 1.0 Gpa per a monofilament.

Example 14

Titanium isopropoxide (200.0 g) and ethyl salicylate (extra pure reagent, manufactured by Wako Pure Pharmaceuticals Co., Ltd.)(46.7 g) were dissolved in isopropyl alcohol (324.7 g) and the solution was refluxed under a nitrogen atmosphere for 1 hour to prepare an alcohol solution of titanium isopropoxide. At this time, a molar ratio of ethyl salicylate to titanium isopropoxide is 0.40. Separately, pure water (31.5 g) was mixed with isopropyl alcohol (284.3 g) to prepare an alcohol solution having a water concentration of 10% by weight. The amount of water is 2.5 mole per 1 mole of titanium alkoxide used. The alcohol solution of titanium isopropoxide was heated and refluxed under boiling in a nitrogen atmosphere and, at the same time, an alcohol solution having a water concentration of 10% by weight was added into the solution of the titanium isopropoxide under stirring with distilling the alcohol. When the total amount of water was added, the solution was in slurry state.

After the slurry was refluxed for 1 hour, the alcohol was distilled with heating. Furthermore, the slurry was continuously heated with an oil bath at 130° C. until the distilled solution can not be obtained to dry the polymer.

The polymer was dissolved in tetrahydrofuran (270 g) with heating and etyl silicate 40 (24.8 g ) was added into the tetrahydrofuran solution and the solution was refluxed for 1 hour. After filtering through a Teflon membrane filter having a pore diameter of 3 μm, tetrahydrofuran was distilled by heating to obtain a spinning solution. Then the polymer was spun by using the spinning solution to obtain a precursor fiber. According to the same manner as that described in Example 1, the precursor fiber was treated with water vapor and then calcined to obtain a titania fiber.

In this method, a difference between the amount of water added and the amount of water discharged out of the reaction system was 1.75 mole per 1 mole of titanium isopropoxide used. The crystal form of the resulting titania fiber was an anatase and, furthermore, the average diameter was 14 μm per a monofilament and the average tensile strength was 0.9 Gpa per a monofilament.

Example 15

Titanium isopropoxide (300.0 g) and ethyl acetoacetate (54.9 g) were dissolved in isopropyl alcohol (73.6 g) and the solution was refluxed under a nitrogen atmosphere for 1 hour to prepare an alcohol solution of titanium isopropoxide. At this time, a molar ratio of ethyl acetoacetate to titanium isopropoxide is 0.40. Separately, pure water (43.6 g) was mixed with isopropyl alcohol (393.2 g) to prepare an alcohol solution having a water concentration of 10% by weight. The amount of water is 2.3 mole per 1 mole of titanium alkoxide.

The alcohol solution of titanium isopropoxide was heated in a nitrogen atmosphere and refluxed under boiling. At the same time, an alcohol solution having a water concentration of 10% by weight was added into the solution of titanium isopropoxide with distilling the alcohol under stirring. The distillation rate of the alcohol was adjusted to a rate which is almost the same as the addition rate of the solution of water. The addition period of time was adjusted to 160 min. When the total amount of water was added, the solution was in slurry state. The amount of water discharged out of the system by this operation was 0.20 mole per 1 mole of the titanium alkoxide used.

After the slurry was refluxed for 1 hour, the alcohol was distilled with heating to obtain 305 g of a concentrated slurry. The amount of water discharged out of the system by this operation was 0.17 mole per 1 mole of the titanium alkoxide used.

The alcohol was distilled by heating the concentrated slurry and, at the same time, isopropyl alcohol (700 g) was added to remove water in the concentrated slurry. The distillation rate was adjusted to a rate which is the same as the addition rate of the alcohol. The addition period of time was adjusted to 1.5 hours. The amount of water discharged out of the system by this operation was 0.24 mole per 1 mole of the titanium alkoxide used. Accordingly, a difference between the amount of water added and the amount of water discharged together with the alcohol out of the reaction system was 1.69 mole [=2.3−(0.20+0.17 +0.24)] per 1 mole of the titanium alkoxide.

After the dehydrated concentrated slurry was dissolved in tetrahydrofuran (352 g), ethyl silicate 40 (37.2 g) was added and the solution was refluxed for 1 hour. According to the same manner as that described in Example 1, the solution was filtered and concentrated to prepare a spinning solution and then the polymer was spun by using the spinning solution to obtain a precursor fiber. According to the same manner as that described in Example 1, the precursor fiber was treated with water vapor and then calcined to obtain a titania fiber. The crystal form of the resulting fiber was an anatase and, furthermore, the average diameter was 15 μm per a monofilament and tensile strength was 1.1 Gpa per a monofilament.

Example 16

According to the same manner as that described in Example 15 except for using a nozzle having a diameter of 30 μm, a titania fiber was obtained. The crystal form of the resulting fiber was an anatase and, furthermore, the average diameter was 10 μm per a monofilament and the average tensile strength was 1.3 Gpa per a monofilament.

Comparative Example 1

Titanium isopropoxide (100.0 g) and ethyl acetoacetate (11.4 g) were dissolved in tetrahydrofuran (233.3 g) and the solution was refluxed under a nitrogen atmosphere for 1 hour to prepare a tetrahydrofuran solution of titanium isopropoxide. At this time, a molar ratio of ethyl acetoacetate to titanium isopropoxide is 0.25. Separately, pure water (10.7 g) was mixed with tetrahydrofuran (1781.7 g) to prepare a tetrahydrofuran solution having a water concentration of 0.6% by weight. The amount of water is 1.7 mole per 1 mole of the titanium alkoxide used.

The tetrahydrofuran solution of titanium isopropoxide was heated and refluxed under boiling in a nitrogen atmosphere and, at the same time, an tetrahydrofuran solution having a water concentration of 0.6% by weight was added into the solution of the titanium isoprcoxide under stirring with distilling the tetrahydrofuran. When the total amount of water was added, deposition of a polymer was not recognized and the solution was transparent. Ethyl silicate 40 (12.4 g) was added to this solution, and the solution was refluxed for 1 hour and then concentrated with heating. As a result, a viscous solution having stringiness was obtained. At this time, a viscosity of the solution was 50 poise at 40° C.

According to the same manner as that described in Example 1, spinning was conducted by using the viscous solution to obtain a precursor fiber. According to the same manner as that described in Example 1, the precursor fiber was treated with water vapor and then calcined to obtain a titania fiber. In this Comparative Example, a difference between the amount of water added and the amount of water discharged out of the system was 1.68 mole per 1 mole of titanium isopropoxide used. The crystal form of the resulting fiber was an anatase and, furthermore, the average diameter was 16 μm per a monofilament and the average tensile strength was 0.4 Gpa per a monofilament.

Comparative Example 2

Titanium isopropoxide (100.0 g) and ethyl acetoacetate (11.4 g) were dissolved in tetrahydrofuran (233.3 g) and the solution was refluxed under a nitrogen atmosphere for 1 hour to prepare a tetrahydrofuran solution of titanium isopropoxide. At this time, a molar ratio of ethyl acetoacetate to titanium isopropoxide is 0.25. Separately, pure water (11.3 g) was mixed with tetrahydrofuran (1886.6 g) to prepare a tetrahydrofuran solution having a water concentration of 0.6% by weight. The amount of water is 1.8 mole per 1 mole of the titanium alkoxide.

The tetrahydrofuran solution of titanium isopropoxide was heated and refluxed under boiling in a nitrogen atmosphere and, at the same time, an tetrahydrofuran solution having a water concentration of 0.6% by weight was added into the solution of the titanium isopropoxide under stirring with distilling the tetrahydrofuran. When the total amount of water was added, deposition of a polymer was not recognized and the solution was transparent. When this transparent solution was refluxed for 1 hour, the solution was partially gelated and, finally, the whole solution was solidified in the form of agar, thereby making it impossible to prepare a spinning solution.

Example 17

The precursor fiber obtained by the same method as that described in Example 15 was put in a thermo-hygrostat (85° C., RH: 95%, water vapor partial pressure: 0.54 atm) and treated with water vapor for 15 hours Then, the precursor fiber was heated at a rate of 200° C./hour and was calcined at 900° C. in air for 30 mmn to obtain a titania fiber.

The resulting titania fiber had an average diameter per a monofilament of 16 μm and a BET specific surface area of 132 $m^2$/g. The pore volume by the nitrogen absorption method was 0.22 cc/g and the volume of pores having a pore diameter of not less than 10 angstroms was 0.22 cc/g. The average tensile strength was 0.2 Gpa per a monofilament. According to the XRD analysis, the fiber was an anatase titanium oxide and only a peak of anatase-form crystal was recognized.

Example 18

The precursor fiber which was obtained in the same method as in Example 15 was put in a thermo-hygrostat (85° C., RH: 95%, water vapor partial pressure: 0.54 atm) and treated with water vapor for 5 hours. Then, the precursor fiber was heated at a rate of 200° C./hour and was calcined at 700° C. in air for 30 min to obtain a titania fiber.

The resulting titania fiber had an average diameter per a monofilament of 16 μm and a BET specific surface area of 153 $m^2$/g. The pore volume by the nitrogen absorption method was 0.14 cc/g and the volume of pores having a pore diameter of not less than 10 angstroms was 0.06 cc/g. The average tensile strength was 0.6 Gpa per a monofilament. According to the XRD analysis, the fiber was an anatase-form titanium oxide.

Example 19

The precursor fiber which was obtained in the same method as in Example 1 was put in a thermo-hygrostat (95° C., RH: 95%, water vapor partial pressure: 0.79 atm) and treated with a water vapor for 24 hours. Then, the precursor fiber was heated at a rate of 200° C./hour and was calcined at 500° C. in air for 30 min to obtain a titania fiber.

The resulting titania fiber had an average diameter per a monofilament of 17 μm and a BET specific surface area of 219 $m^2$/g. The pore volume by the nitrogen absorption method was 0.35 cc/g and the volume of pores having a pore diameter of not less than 10 angstroms was 0.24 cc/g. The average tensile strength was 0.1 Gpa per a monofilament. According to the XRD analysis, the fiber was an anatase-form titanium oxide.

Example 20

The precursor fiber which was obtained in the same method as in Example 1 was put in a thermo-hygrostat (95° C., RH:95%, water vapor partial pressure: 0.79 atm) and treated with water vapor for 24 hours. Then, the precursor fiber was heated at a rate of 200° C./hour and was calcined at 900° C. in air for 30 min to obtain a titania fiber.

The resulting titania fiber had an average diameter per a monofilament of 17 μm and a BET specific surface area of 104 $m^2$/g. The pore volume by the nitrogen absorption method was 0.21 cc/g and the volume of pores having a pore diameter of not less than 10 angstroms was 0.21 cc/g. The average tensile strength was 0.2 Gpa per a monofilament. According to the XRD analysis, the fiber was an anatase-form titanium oxide.

Example 21

The precursor fiber which was obtained in the same method as in Example 15 was calcined in a tubular furnace. In this case, when the temperature in the furnace reached 100° C., wet air having a water vapor partial pressure of 0.38 atm was fed into the tubular furnace by bubbling air into water at 75° C. and the temperature in the furnace was maintained at 150° C. for 2 hours. Then, the wet air was replaced by dry air, the precursor fiber was calcined at 800° C. for 30 min to obtain a titania fiber.

The resulting titania fiber had an average diameter per a monofilament of 16 μm and a BET specific surface area of 66 $m^2$/g. The pore volume by the nitrogen absorption method was 0.12 cc/g and the volume of pores having a pore diameter of not less than 10 angstroms was 0.06 cc/g. The average tensile strength was 0.7 Gpa per a monofilament. According to the XRD analysis, the fiber was an anatase-form titanium oxide.

Example 22

The precursor fiber which was obtained in the same method as in Example 1 was put in a thermo-hygrostat (85° C., RH: 95%, water vapor partial pressure: 0.54 atm) and treated with water vapor for 15 hours. Then, the precursor fiber was heated at a rate of 200° C./hour and was calcined at 900° C. in air for 30 min to obtain a porous titania fiber.

The resulting titania fiber had an average diameter per a monofilament of 16 μm and a BET specific surface area of 134 $m^2$/g. The pore volume by the nitrogen absorption method was 0.22 cc/g and the volume of pores having a pore diameter of not less than 10 angstroms was 0.22 cc/g. The average tensile strength was 0.2 Gpa per a monofilament. According to the XRD analysis, the fiber was an anatase-form titanium oxide and only a peak of anatase-form crystal was recognized.

A vanadium oxide-carrying titania fiber to be used as a catalyst for catalytic reduction of a nitrogen oxide was produced by the following method.

An aqueous oxalic acid solution (0.5 mole/L) was prepared and ammonium methavanadate was added to the aqueous solution to prepare a solution so that she ammonium methavanadate content becomes 5% by weight. The titania fiber produced as described above was immersed in the resulting solution, pulled up and then dried at 110° C. for 2 hours. After drying, the fiber was calcined at 400° C. for 1 hour to obtain a catalyst fiber, which is a catalyst component-carrying titania fiber.

The amount of vanadium oxide carried on and in the catalyst fiber was 6.2% by weight based on the catalyst fiber. According to the SEM observation, there were no vanadium oxide particles which were liable to come off on the outer surface of the catalyst fiber, as shown in FIG. 1. According to the EPMA analysis, the fractured surface of the catalyst fiber of the cross section was confirmed that the vanadium oxide was uniformly carried in the catalyst fiber.

Then, catalyst performance test of the catalyst fiber as to reduction of a nitrogen oxide was conducted as following.

After weighing 2 g of the catalyst fiber, the catalyst fiber was packed in a reaction tube having an inner diameter of 24 mm φ so that a packing height becomes 2 cm. Then, a gas containing NO (100 ppm), $NH_3$ (100 ppm) and $O_2$ (20%)

(200° C.) was passed through the reaction tube at a gas rate of 1 L/min. A nitrogen oxide removal efficiency was calculated with the following formula. As a result, a nitrogen oxide removal efficiency was 97%.

Nitrogen oxide removal efficiency(%)=[(Y−X)/Y]×100
X: NO content in the gas which flowed out of the tube Y: NO content in the gas which flowed into of the tube

Example 23

The precursor fiber which was obtained in the same method as in Example 1 was put in a thermo-hygrostat (85° C., RH: 95%, water vapor partial pressure: 0.54 atm) and treated with water vapor for 5 hours. Then, the precursor fiber was heated at a rate of 200° C./hour and was calcined at 700° C. in air for 30 min to obtain a porous titania fiber.

The resulting titania fiber had an average diameter per a monofilament of 16 μm and a BET specific surface area of 149 m$^2$/g. The pore volume by the nitrogen absorption method was 0.14 cc/g and the volume of pores having a pore diameter of not less than 10 angstroms was 0.06 cc/g. The average tensile strength was 0.6 Gpa per a monofilament. According to the XRD analysis, the fiber was an anatase-form titanium oxide.

Using the porous titania fiber, a catalyst fiber was prepared according to the same manner as that described in Example 22. An amount of the vanadium oxide carried on and in the catalyst fiber was 5.9% by weight based on the catalyst fiber. According to SEM observation, there were no vanadium oxide particles which were liable to come off on the outer surface of the catalyst fiber. According to the EPMA analysis, the fractured surface or the catalyst fiber of the cross section was confirmed that the vanadium oxide was uniformly carried in the catalyst fiber in an amount of smaller than that in Example 22.

According to the same manner as that described in Example 22, a catalyst performance test was conducted. As a result, a nitrogen oxide removal efficiency was 72%.

Example 24

The precursor fiber which was obtained in the same method as in Example 1 was put in a thermo-hygrostat (85° C., RH: 95%, water vapor partial pressure: 0.54 atm) and treated with water vapor for 10 hours. Then, the precursor fiber was heated at a rate of 200° C./hour and was calcined at 900° C. in air for 30 min to obtain a porous titania fiber.

The resulting titania fiber had an average diameter per a monofilament of 15 μm and a BET specific surface area of 77 m$^2$/g. The pore volume by the nitrogen absorption method was 0.11 cc/g and the volume of pores having a pore diameter of not less than 10 angstroms was 0.11 cc/g. The average tensile strength was 0.7 Gpa per a monofilament. According to the XRD analysis, the fiber was an anatase-form titanium oxide.

Using the porous titania fiber, a catalyst fiber was prepared according to the same manner as that described in Example 22. An amount of the vanadium oxide carried on and in the catalyst fiber was 6.0% by weight based on the catalyst fiber. According to the SEM observation, there were no vanadium oxide particles which were liable to come off on the outer surface of the catalyst fiber. According to the EPMA analysis, the fractured surface of the catalyst fiber of the cross section was confirmed that the vanadium oxide was uniformly carried in the catalyst fiber in an amount which is intermediate between the amount of Example 22 and that of Example 23.

According to the same manner as that described in Example 22, a catalyst performance test was conducted. As a result, a nitrogen oxide removal efficiency was 92%.

Comparative Example 3

The precursor fiber which was obtained in the same method as in Example 1 was put in a thermo-hygrostat (85° C., RH: 95%, water vapor partial pressure: 0.54 atm) and treated with water vapor for 1 hour. Then, the precursor fiber was heated at a rate of 200° C./hour and was calcined at 900° C. in air for 30 min to obtain a porous titania fiber.

The resulting titania fiber had an average diameter per a monofilament of 15 μm and a BET specific surface area of 0.4 m$^2$/g. The pore volume by the nitrogen absorption method was less than 0.01 cc/g and the volume of pores having a pore diameter of not less than 10 angstroms was less than 0.01 cc/g. The average tensile strength was 1.0 Gpa per a monofilament. According to the XRD analysis, the fiber was an anatase-form titanium oxide.

Figure 2:
FIG. 2 shows the outer surface appearance of the catalyst component-carrying titania fiber made from a titania fiber having a BET specific surface of 0.4 m²/g and a pore volume of less than 0.01 cc/g (see Comparative Example 3).

Using the porous titania fiber, a catalyst fiber was prepared according to the same manner as that described in Example 22. An amount of the vanadium oxide carried on and in the catalyst fiber was 5.3% by weight based on the catalyst fiber. According to the SEM observation, there were large amounts of oxide particles adhered on the outer surface of the fiber as shown in FIG. 2, because the pore volume is small and therefore vanadium oxide particles can not be charged in the fiber. According to the EPMA analysis, the fractured surface of the catalyst fiber of the cross section was analyzed. As a result, it was confirmed that only a small amount of the vanadium oxide was carried in the catalyst fiber.

According to the same manner as that described in Example 22, a catalyst performance test was conducted. As a result, a nitrogen oxide removal efficiency was 29%.

Comparative Example 4

The precursor fiber which was obtained in the same method as in Example 1 was put in a thermo-hygrostat (85° C., RH: 95%, water vapor partial pressure: 0.54 atm) and treated with water vapor for 3 hours. Then, the precursor fiber was heated at a rate of 200° C./hour and was calcined at 600° C. in air for 30 min to obtain a porous titania fiber.

The resulting titania fiber had an average diameter per a monofilament of 15 μm and a BET specific surface area of 90 m$^2$/g. The pore volume by the nitrogen absorption method was 0.06 cc/g and the volume of pores having a pore diameter of not less than 10 angstroms was 0.01 cc/g. The average tensile strength was 0.6 Gpa per a monofilament. According to the XRD analysis, the fiber was an anatase-form titanium oxide.

Using the porous titania fiber, a catalyst fiber was prepared according to the same manner as that described in Example 22. An amount of the vanadium oxide carried on and in the catalyst fiber was 6.1% by weight based on the catalyst fiber. According to the SEM observation, there were vanadium oxide particles on the outer surface of the catalyst fiber although the amount of the oxide particles is smaller than that in Comparative Example 3. According to the EPMA analysis, the fractured surface of the catalyst fiber of the cross section was confirmed that the vanadium oxide was carried in the catalyst fiber in an amount of smaller than that in each of Examples 22 to 24.

According to the same manner as that described in Example 22, a catalyst performance test was conducted. As a result, a nitrogen oxide removal efficiency was 44%.

What is claimed is:

1. A catalyst component-carrying titania fiber carrying a catalyst component on and/or in a continuous fiber of titania which comprises:
 (i) a continuous fiber of titania having an average diameter per a monofilament of from 5 to 50 µm, which has a BET specific surface area of 10 $m^2$/g or more, a pore volume of 0.05 cc/g or more, a volume of pores having a pore diameter of not less than 10 angstroms being 0.02 cc/g or more and an average tensile strength per a monofilament of 0.1 GPa or more, or which has an average tensile strength per a monofilament of 0.5 GPa or more;
 (ii) a continuous fiber of titania having tn average diameter per a monofilament of from 5 to 50 µm and an average tensile strength per a monofilament of 0.5 GPa or more; or
 (iii) a continuous fiber of titania having an average diameter per a monofilament of from 5 to 50 µm, a BET specific surface area of 10 $m^2$/g or more, a pore volume of 0.05 cc/g or more, a volume of pores having a pore diameter of not less than 10 angstroms being 0.02 cc/g or more and an average tensile strength per a monofilament of 0.1 GPa or more.

2. A catalyst component-carrying titania fiber according to claim 1, wherein the continuous fiber of titania comprises said (iii).

3. The catalyst component-carrying titania fiber according to claim 1, wherein the catalyst component is at least one member selected from the group consisting of V, W, Al, As, Ni, Zr, Mo, Ru, Mg, Ca, Pt, a metal oxide of any thereof and a complex oxide of any thereof.

4. The catalyst component-carrying titania fiber according to claim 1, wherein the catalyst component is at least one member selected from the group consisting of V, W, Mo, a metal oxide of any thereof and a complex oxide of any thereof.

5. A method for producing the catalyst component-carrying titania fiber of claim 1, which comprises the combination of steps of immersing the continuous fiber of titania in a solution containing a catalyst component, drying and calcining said continuous fiber.

* * * * *